(12) United States Patent
Cai et al.

(10) Patent No.: US 11,519,656 B2
(45) Date of Patent: Dec. 6, 2022

(54) HIGH-PRECISION CONTROL SYSTEM AND METHOD FOR SHIPBORNE CRYOGENIC FLASH FREEZING OF AQUATIC PRODUCT USING LIQUID NITROGEN

(71) Applicants: Ocean Research Center of Zhoushan, Zhejiang University, Zhoushan (CN); Zhejiang University, Zhejiang (CN)

(72) Inventors: Yong Cai, Zhoushan (CN); Shuo Liu, Zhoushan (CN); Zhijian Yang, Zhoushan (CN); Kaiyou Jiang, Zhoushan (CN); Wanglin Lin, Zhoushan (CN); Yu Zhang, Zhoushan (CN); Lei Chen, Zhoushan (CN); Zhiyong Sun, Zhoushan (CN); Fan Ding, Zhoushan (CN); Bo Zhang, Zhoushan (CN); Kai Qiao, Zhoushan (CN); Hao Wang, Zhoushan (CN)

(73) Assignees: Ocean Research Center of Zhoushan, Zhejiang University, Zhoushan (CN); Zhejiang University, Hangzhou (CN)

( * ) Notice: Subject to any disclaimer, the term of this patent is extended or adjusted under 35 U.S.C. 154(b) by 421 days.

(21) Appl. No.: 16/817,227

(22) Filed: Mar. 12, 2020

(65) Prior Publication Data

US 2021/0190404 A1 Jun. 24, 2021

(30) Foreign Application Priority Data

Dec. 20, 2019 (CN) .......................... 201911327013.9
Dec. 20, 2019 (CN) .......................... 201911328928.1

(51) Int. Cl.
*F25D 3/11* (2006.01)
*A23L 3/375* (2006.01)
*F25D 29/00* (2006.01)
*B63B 35/24* (2006.01)

(52) U.S. Cl.
CPC ................ *F25D 3/11* (2013.01); *A23L 3/375* (2013.01); *F25D 29/001* (2013.01); *B63B 35/24* (2013.01)

(58) Field of Classification Search
CPC . F25D 3/11; F25D 29/001; F25D 3/10; F25D 2700/06; A23L 3/375; B63B 35/24; A23B 4/09
USPC .......................................................... 62/63
See application file for complete search history.

(56) References Cited

U.S. PATENT DOCUMENTS

2013/0333396 A1* 12/2013 Handley .............. B60H 1/3202
62/48.1

* cited by examiner

*Primary Examiner* — Steve S Tanenbaum
(74) *Attorney, Agent, or Firm* — Metis IP LLC

(57) ABSTRACT

A high-precision control system and method for shipborne cryogenic flash freezing of an aquatic product using liquid nitrogen is described. The system may include a main control system, a display unit, a liquid nitrogen supply system, a valve control unit, an acquisition unit, and a power unit. A flash freezing process is divided into four stages: a precooling stage, a flash freezing stage, a deep freezing stage, and a thermal insulation stage. Different cooling rates and flash freezing times are used for different stages, where a cooling rate is used in the flash freezing stage is the highest, a cooling rate used in the deep freezing stage is next, a cooling rate used in the precooling stage is the lowest, and an ambient temperature in a device is kept stable in the thermal insulation stage.

20 Claims, 5 Drawing Sheets

HIGH-PRECISION CONTROL SYSTEM AND METHOD FOR SHIPBORNE CRYOGENIC FLASH FREEZING OF AQUATIC PRODUCT USING LIQUID NITROGEN

TECHNICAL FIELD

The present disclosure relates to the field of seafood preservation technologies, and specifically to a high-precision control system and method for shipborne cryogenic flash freezing of an aquatic product using liquid nitrogen.

BACKGROUND

China has the largest fishing industry in the world, having abundant aquatic resources and various aquatic products. In 2018, a gross output value of the nationwide fishing industry reached 1281.5 billion RMB, and an output value of marine fishing was 222.8 billion RMB; a gross production of aquatic products was 64570 thousand tons, a production of seawater aquatic products was 33010 thousand tons, and a production of the distant fishery was 2250 thousand tons. Since 2012, the central finance greatly increased investment on the fishing industry, providing optimal guarantee for highly sustainable development of the fishing economy.

As offshore resources constantly decline, the state encourages development of open-sea operation and distant fishing. For a fishing ship, how to further preserve captured seafood on the ship to ensure quality and values of the captured seafood is very important. Ice is usually used to preserve a captured aquatic product on a fishing ship in a domestic fishery for a long time. This conventional method has many limitations, and a preservative is needed for preservation later. For example, sodium metabisulfite (shrimp meal) is added, and is decomposed into sulfur dioxide, formalin (methanol), and the like, which all are carcinogenic substances, leading to food safety hidden dangers, and affecting people's health. Recently, fishing ships started to use feron refrigerators. Although an aquatic product preservation level is improved to some extent, for this preservation manner, a preservative such as shrimp meal still needs to be added.

SUMMARY

In view of defects of an existing technology, the present disclosure provides a high-precision control system and method for shipborne cryogenic flash freezing of an aquatic product using liquid nitrogen.

Using an ultra-low temperature, i.e., cryogenic, flash freezing technology using liquid nitrogen, an extremely high freezing strength instantly released by liquid nitrogen is used, and seafood quickly passes through an ice crystal generation zone, so that denaturation of protein is effectively suppressed, few damages are caused to muscle fibers, weight loss is effectively controlled, and quality of a frozen product after unfreezing is the same as quality of the frozen product in a frozen state. Meanwhile, with constant development of the science and technology, deep processing and storage technologies of seafood are constantly improved, and an overall trend of current industry development is as follows: Processing and storage of seafood are performed earlier, as the seafood is processed on a ship, and a "movable factory at sea" has become a new mode. If the ultra-low temperature flash freezing technology using liquid nitrogen is directly used in a marine fishing and processing ship, a level of preserving seafood from a source can be improved, and freshness quality of an aquatic product is maintained to the greatest extent. Therefore, it is very important to provide a high-precision control system and method for shipborne cryogenic flash freezing of an aquatic product using liquid nitrogen.

The technical solution used to solve the technical problem is as follows: A system for supplying liquid nitrogen for shipborne cryogenic flash freezing of an aquatic product using liquid nitrogen includes a main control system, a display unit, a liquid nitrogen supply system, a valve control unit, an acquisition unit, and a power unit.

The main control system is configured to control the valve control unit, the liquid nitrogen supply system, the acquisition unit, and the power unit. The main control system integrates a liquid nitrogen flash freezing process for an aquatic product, including optimal matching of the parameters of the valve control unit, the liquid nitrogen supply system, the acquisition unit, and the power unit when aquatic products of different categories and different specifications are flash frozen by using liquid nitrogen.

The display unit is configured to display and set multiple parameters of a high-precision control system and a real-time running status of the control system.

The acquisition unit may include temperature sensors, where a temperature sensor A is configured to measure an internal ambient temperature of a flash freezing device, and a temperature sensor B is configured to measure a core temperature of a flash-frozen aquatic product.

The liquid nitrogen supply system may include a liquid nitrogen storage tank system and a pipeline system, where the liquid nitrogen storage tank system includes multiple horizontal storage tanks connected in parallel, and the storage tanks are separately disposed on a deck and in a steering engine room based on existing space of a fishing ship. The pipeline system includes a liquid nitrogen filling pipeline, a liquid nitrogen pressurization pipeline, a liquid nitrogen supply pipeline, and a release and exhaust pipeline. An electric liquid filling stop valve is disposed on the liquid nitrogen filling pipeline close to an outlet of each horizontal storage tank; a safety valve A, a safety valve B, a pressure valve, and a discharge valve are disposed on the release and exhaust pipeline close to the outlet of each horizontal storage tank, and a pressure setpoint of the safety valve B is higher than a pressure setpoint of the safety valve A, but is lower than an upper pressure limit of the horizontal storage tank; an electric liquid nitrogen supply stop valve is disposed on the liquid nitrogen supply pipeline close to the outlet of the horizontal storage tank. Pressurized liquid outlet valves, a pressurizer, a pressure regulating valve, and pressurized liquid return valves are disposed on the liquid nitrogen pressurization pipeline, to regulate a liquid nitrogen pressure inside each horizontal storage tank to a needed setpoint, to ensure that the valve control unit can work normally. The liquid nitrogen storage tank system shares the pressurizer and the pressure regulating valve. An upper electric stop valve needs to be mounted on a liquid nitrogen supply pipeline on the deck, and a lower electric stop valve needs to be mounted on a liquid nitrogen supply pipeline in a cabin before the liquid nitrogen supply pipeline on the deck joins the liquid nitrogen supply pipeline in the cabin, and the joining liquid nitrogen supply pipeline is connected to the valve control unit.

The valve control unit may include a liquid nitrogen filter, a pressure transmitter, a safety valve, an electric ball valve, a combined low-temperature solenoid valve, and a liquid nitrogen spraying system, and is configured to precisely adjust a flow of liquid nitrogen. The safety valve is configured to monitor a pressure inside a liquid nitrogen tube, and automatically relieve pressure when a value of the pressure inside the liquid nitrogen tube is greater than a safety pressure value set for the safety valve. The electric ball valve is a stop valve, and controls connection and disconnection of the liquid nitrogen tube. The combined low-temperature solenoid valve combines a small-diameter switch valve, an intermediate-diameter switch valve, and a large-diameter switch valve, and controls an open-close time proportion of the switch valve by means of a pulse width modulation (PWM) wave duty cycle, and equivalently simulates a size of an opening of a valve port of the switch valve.

The power unit is configured to control an exhaust fan and a circulation fan.

A shipborne ultra-low temperature preservation control method for an aquatic product, using the foregoing system, may include:

placing an aquatic product inside a liquid nitrogen flash freezing device, selecting a corresponding liquid nitrogen flash freezing process in an expert database system, and pressing an automatic button on an interface of a display unit to start to flash freeze the aquatic product by using liquid nitrogen.

A flash freezing process is divided into four stages: a precooling stage, a flash freezing stage, a deep freezing stage, and a thermal insulation stage, and different cooling rates and flash freezing times are used for different stages, where a cooling rate used in the flash freezing stage is the highest, a cooling rate used in the deep freezing stage comes the second, a cooling rate used in the precooling stage is the lowest, and an ambient temperature in the device is kept stable in the thermal insulation stage.

Some potential beneficial effects of the present process and system as disclosed may include: a small amount of liquid nitrogen is consumed; a temperature is controlled precisely; a flash freezing rate is high; and there is no need to add a preservative to a flash-frozen aquatic product, thereby enabling high environmental quality, improving a shipborne source preservation level of an aquatic product, and increasing an added value of the product.

In the figures: 1-1 is a horizontal storage tank; 1-2 is an upper electric stop valve; 1-3 is a lower electric stop valve; 2-1 is a pressurizer; 2-2 is a pressurized liquid outlet valve; 2-3 is a liquid level gauge; 2-4 is a safety valve A; 2-5 is a safety valve B; 2-6 is a pressure valve; 2-7 is a discharge valve; 2-8 is an electric liquid filling stop valve; 2-9 is an electric liquid nitrogen supply stop valve; 2-10 is a pressurized liquid return valve; and 2-11 is a pressure regulating valve.

DETAILED DESCRIPTION

The following description refers to the accompanying drawings.

Figure 1:
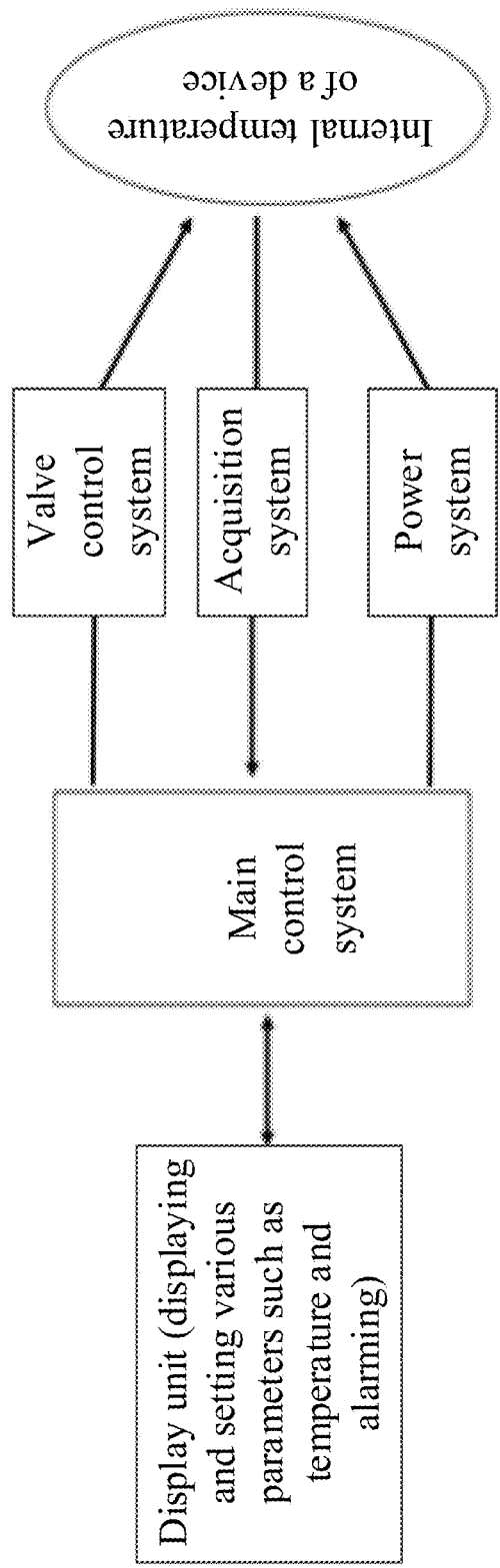
FIG. 1 is a structural diagram of a system for supplying liquid nitrogen for shipborne cryogenic flash freezing of an aquatic product using liquid nitrogen.

As shown in FIG. 1, a system for supplying liquid nitrogen for shipborne cryogenic flash freezing of an aquatic product using liquid nitrogen may include a main control system, a display unit, a liquid nitrogen supply system, a valve control unit, an acquisition unit, and a power unit.

The main control system is configured to control the valve control unit, the liquid nitrogen supply system, the acquisition unit, and the power unit. The main control system integrates a liquid nitrogen flash freezing process expert database system for an aquatic product, including optimal matching of the parameters of the valve control unit, the liquid nitrogen supply system, the acquisition unit, and the power unit when aquatic products of different categories and different specifications are flash frozen by using liquid nitrogen.

The display unit is configured to display and set various parameters of a high-precision control system and a real-time running status of the control system.

The acquisition unit may include temperature sensors, where a temperature sensor A is configured to measure an internal ambient temperature of a flash freezing device, and a temperature sensor B is configured to measure a core temperature of a flash-frozen aquatic product.

Figure 2:
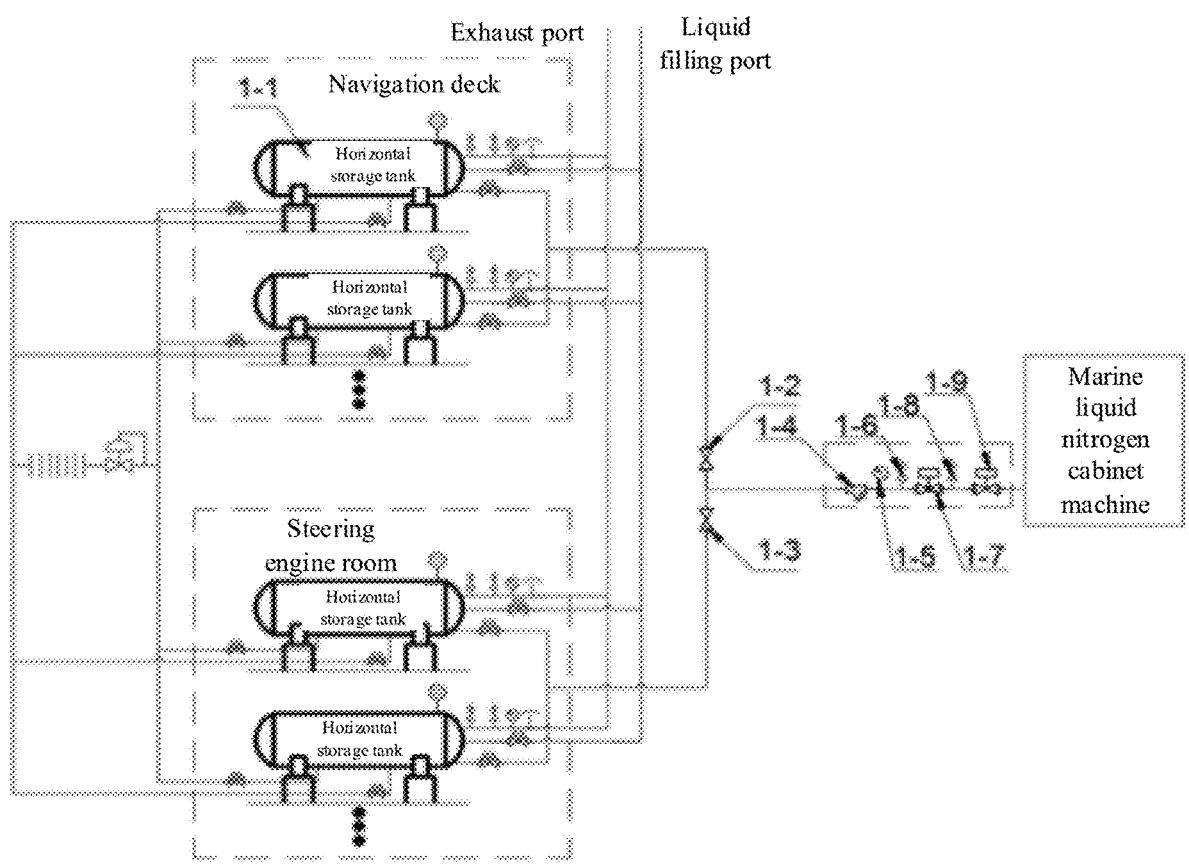
FIG. 2 is a schematic diagram of a system for supplying liquid nitrogen for shipborne cryogenic flash freezing of an aquatic product using liquid nitrogen.
Figure 3:
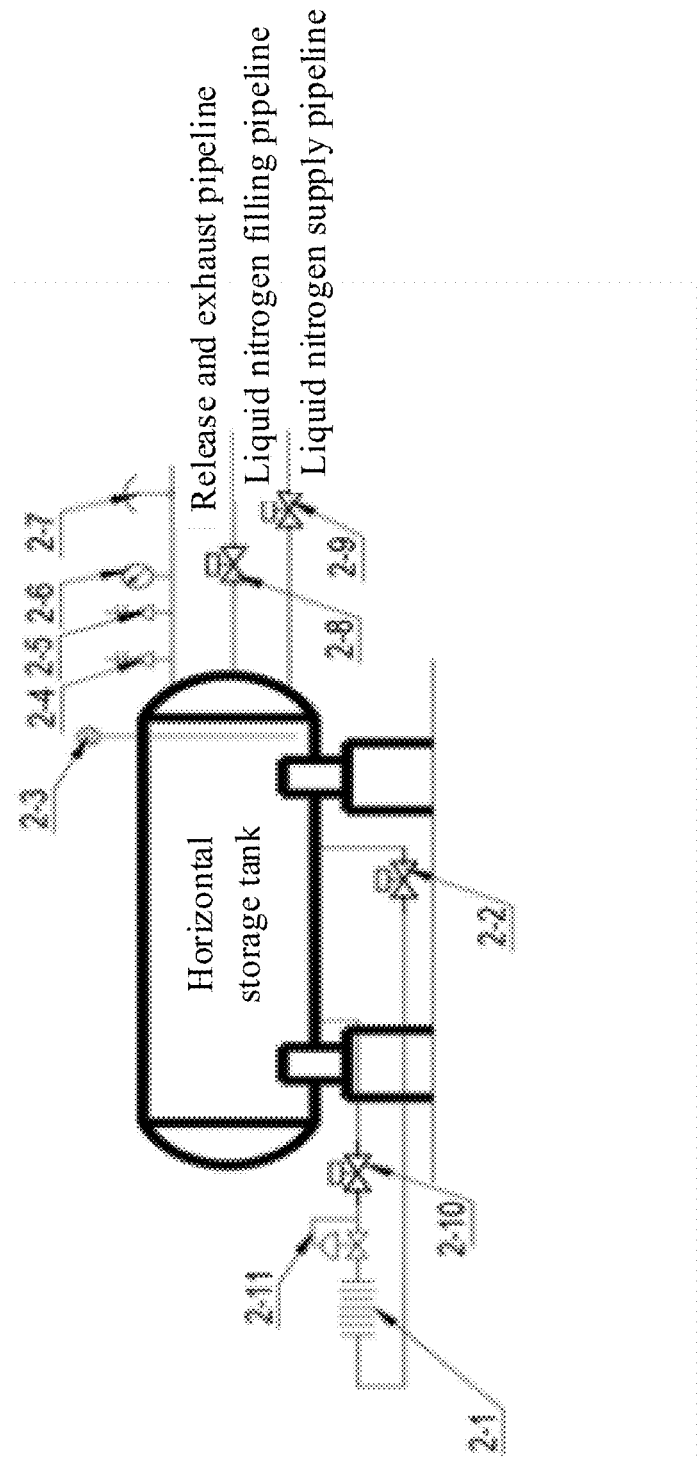
FIG. 3 is a schematic diagram of a single horizontal storage tank.

As shown in FIG. 2 and FIG. 3, the liquid nitrogen supply system may include a liquid nitrogen storage tank system and a pipeline system. The liquid nitrogen storage tank system includes multiple horizontal storage tanks 1-1 connected in parallel, the tanks are separately disposed on a deck and in a steering engine room based on existing space of a fishing ship, some tank bodies are placed in the steering engine room for stowage, and the other tank bodies are placed on a navigation deck, to meet a stability requirement of the fishing ship. The horizontal storage tanks each are of a double-layer structure including an inner housing and an outer housing, space between the inner housing and the outer housing is vacuumized to implement thermal insulation, and ribbed plates are used for dense support between the inner housing and the outer housing, to ensure safe and stable working in a bad sea state.

Each horizontal storage tank is connected to a pressurized liquid outlet valve 2-2, a pressurizer 2-1, a pressure regulating valve 2-11, and a pressurized liquid return valve 2-10, to regulate a liquid nitrogen pressure inside the horizontal storage tank to a needed setpoint, to ensure that the valve control unit can work normally. A separate liquid collection tray is disposed at a bottom part of each horizontal storage tank, and is used to collect leaked liquid nitrogen, thereby preventing the leaked liquid nitrogen from affecting safety of a ship body. A liquid level gauge 2-3 is mounted inside each horizontal storage tank, to gauge a remaining liquid nitrogen amount in the tank.

The pipeline system includes a liquid nitrogen filling pipeline, a liquid nitrogen pressurization pipeline, a liquid nitrogen supply pipeline, and a release and exhaust pipeline. The outside of the pipeline system is covered by a thermal insulation material.

Each horizontal storage tank is connected to a liquid nitrogen filling pipeline, a liquid nitrogen supply pipeline, and a release and exhaust pipeline. An electric liquid filling stop valve 2-8 is disposed on the liquid nitrogen filling pipeline close to an outlet of the horizontal storage tank. A safety valve A 2-1, a safety valve B 2-5, a pressure valve 2-6, and a discharge valve 2-7 are disposed on the release and exhaust pipeline close to the outlet of the horizontal storage tank, and a pressure setpoint of the safety valve B is higher than a pressure setpoint of the safety valve A, but is lower than an upper pressure limit of the horizontal storage tank.

After a pressure inside the horizontal storage tank reaches the setpoint of the safety valve A, the safety valve A is automatically opened, and nitrogen gas is exhausted through the release and exhaust pipeline. When the safety valve A is faulty and cannot work normally, the pressure inside the horizontal storage tank continues to increase. When the pressure reaches the setpoint of the safety valve B, the safety valve B is automatically opened, and nitrogen gas is exhausted through the release and exhaust pipeline. This manner plays a role of double insurance and ensures safety of a horizontal storage tank.

An electric liquid nitrogen supply stop valve 2-9 is disposed on the liquid nitrogen supply pipeline close to the outlet of the horizontal storage tank. An upper electric stop valve 1-2 needs to be mounted on a liquid nitrogen supply pipeline on the deck, and a lower electric stop valve 1-3 needs to be mounted on a liquid nitrogen supply pipeline in a cabin before the liquid nitrogen supply pipeline on the deck joins the liquid nitrogen supply pipeline in the cabin. The joining liquid nitrogen supply pipeline is connected to the valve control unit, and an exhaust port and a liquid filling port are connected to the outside. In this way, nitrogen gas of automatic release does not stay in the sealed steering engine room, thereby ensuring safety.

Liquid nitrogen can be simultaneously filled in the horizontal storage tanks in the liquid nitrogen supply system, and a horizontal storage tank can be filled with liquid nitrogen before liquid nitrogen filling of a previous horizontal storage tank is completed, thereby greatly shortening a liquid nitrogen filling time. When liquid nitrogen needs to be filled in a horizontal storage tank, the electric liquid filling stop valve is opened, and after the horizontal storage tank is full of the liquid nitrogen, the electric liquid filling stop valve is closed.

When a horizontal storage tank on a deck is used to supply liquid nitrogen to a liquid nitrogen flash freezing device, first, the lower electric stop valve is closed, and then the upper electric stop valve, the electric liquid nitrogen supply stop valve, and a pressurization stop valve are sequentially opened. Liquid nitrogen in the horizontal storage tank flows to the valve control unit through the liquid nitrogen supply pipeline. When a horizontal storage tank in the cabin is used to supply liquid nitrogen to the liquid nitrogen flash freezing device, first, the upper electric stop valve is closed, and then the lower electric stop valve, the electric liquid nitrogen supply stop valve, and the pressurization stop valve are sequentially opened. Liquid nitrogen in the horizontal storage tank flows to the valve control unit through the liquid nitrogen supply pipeline.

The valve control unit may include a liquid nitrogen filter, a pressure transmitter, a safety valve, an electric ball valve, a combined low-temperature solenoid valve, and a liquid nitrogen spraying system, and is configured to precisely adjust a flow of liquid nitrogen. The safety valve is configured to monitor a pressure inside a liquid nitrogen tube, and automatically relieve pressure when a value of the pressure inside the liquid nitrogen tube is greater than a safety pressure value set for the safety valve. The electric ball valve is a stop valve, and controls connection and disconnection of the liquid nitrogen tube. The combined low-temperature solenoid valve combines a small-diameter switch valve, an intermediate-diameter switch valve, and a large-diameter switch valve, controls an open-close time proportion of the switch valve by means of a pulse width modulation (PWM) wave duty cycle, and equivalently simulates a size of an opening of a valve port of the switch valve.

The power unit is configured to control an exhaust fan and a circulation fan.

Figure 4:
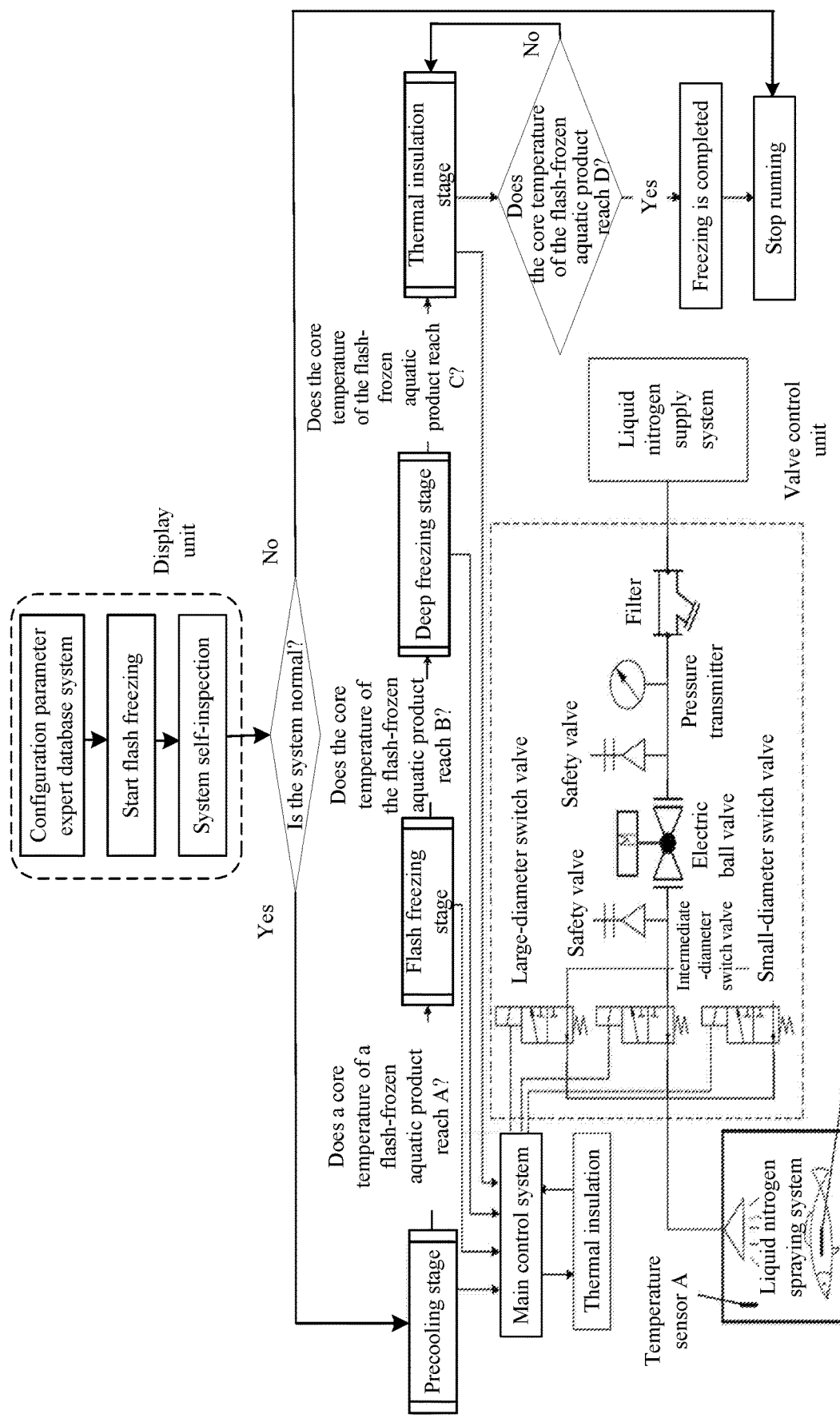
FIG. 4 is a flowchart of a high-precision control method for shipborne cryogenic flash freezing of an aquatic product using liquid nitrogen.

As shown in FIG. 4, a shipborne ultra-low temperature preservation control method for an aquatic product may proceed as follows:

Place a to-be-frozen aquatic product inside a liquid nitrogen flash freezing device, select a corresponding liquid nitrogen flash freezing process in an expert database system, and press an automatic button on an interface of a display unit, to start to flash freeze the aquatic product by using liquid nitrogen.

A flash freezing process is divided into four stages: a precooling stage, a flash freezing stage, a deep freezing stage, and a thermal insulation stage. Different cooling rates and flash freezing times are used for different stages, in other words, a cooling rate used in the flash freezing stage is the highest, a cooling rate used in the deep freezing stage comes the second, a cooling rate used in the precooling stage is the lowest, and an ambient temperature in the device is kept stable in the thermal insulation stage. When a core temperature of the flash-frozen aquatic product reaches A, the flash freezing process is immediately switched from the precooling stage to the flash freezing stage. When the core temperature of the flash-frozen aquatic product reaches B, the flash freezing process is immediately switched from the flash freezing stage to the deep freezing stage. When the core temperature of the flash-frozen aquatic product reaches C, the flash freezing process is immediately switched from the deep freezing stage to the thermal insulation stage. When the core temperature of the flash-frozen aquatic product reaches D, the flash freezing process ends.

After the aquatic product starts to be flash frozen by using liquid nitrogen, the system performs self-inspection, and enters the precooling stage when the system is normal. A main control system sends an instruction to a valve control unit, and the valve control unit starts working, and finally nebulizes and sprays liquid nitrogen onto the inside of the liquid nitrogen flash freezing device by using a liquid nitrogen spraying system. An internal temperature of the liquid nitrogen flash freezing device decreases, and when the internal temperature of the device decreases to a setpoint A1, the device immediately enters a thermal insulation mode, and the valve control unit stops working. The aquatic product absorbs a large amount of cold energy in the flash freezing process, the internal temperature of the device increases, and the valve control unit starts working again. When the internal temperature of the device decreases to the setpoint A1 again, the device enters the thermal insulation mode again, and the valve control unit stops working. When the core temperature of the flash-frozen aquatic product reaches A, the precooling stage is completed, and the device enters the flash freezing stage.

After the device enters the flash freezing stage, the main control system sends an instruction to the valve control unit, and the valve control unit works. The internal temperature of the liquid nitrogen flash freezing device continues to decrease, and when the internal temperature of the device decreases to a setpoint B1, the device immediately enters the thermal insulation mode, and the valve control unit stops working. The aquatic product absorbs a large amount of cold energy in the flash freezing process, the internal temperature of the device increases, and the valve control unit starts working again. When the internal temperature of the device decreases to the setpoint B1 again, the device enters the thermal insulation mode again, and the valve control unit stops working. When the core temperature of the flash-frozen aquatic product reaches B, the precooling stage is completed, and the device enters the deep freezing stage.

After the device enters the deep freezing stage, the main control system sends an instruction to the valve control unit, the valve control unit starts working, the internal temperature of the liquid nitrogen flash freezing device continues to decrease, and when the internal temperature of the device decreases to a setpoint C1, the device immediately enters the thermal insulation mode, and the valve control unit stops working. The aquatic product absorbs a large amount of cold energy in the flash freezing process, the internal temperature of the device increases, the valve control unit starts working again, and when the internal temperature of the device decreases to the setpoint C1 again, the device enters the thermal insulation mode again, and the valve control unit stops working. When the core temperature of the flash-frozen aquatic product reaches C, the deep freezing stage is completed, and the device enters the thermal insulation stage.

After the device enters the thermal insulation stage, the core temperature of the flash-frozen aquatic product continues to decrease, and when the core temperature reaches D, flash freezing is completed, and the system stops working.

Further, for the purpose of reducing a liquid nitrogen consumption amount and improving flash freezing efficiency, for all of the precooling stage, the flash freezing stage, the deep freezing stage, and the thermal insulation stage, control parameters of a combined low-temperature solenoid valve may include the following: when a difference between a value of the internal temperature of the device and the setpoint is less than or equal to 3° C., a small-diameter switch valve is opened, and an intermediate-diameter switch valve and a large-diameter switch valve are closed; when the difference between the value of the internal temperature of the device and the setpoint is greater than 3° C. and less than or equal to 6° C., the intermediate-diameter switch valve is opened, and the small-diameter switch valve and the large-diameter switch valve are closed; when the difference between the value of the internal temperature of the device and the setpoint is greater than 6° C. and less than or equal to 9° C., the large-diameter switch valve is opened, and the small-diameter switch valve and the intermediate-diameter switch valve are closed; when the difference between the value of the internal temperature of the device and the setpoint is greater than 9° C. and less than or equal to 12° C., both the small-diameter switch valve and the intermediate-diameter switch valve are opened, and the large-diameter switch valve is closed; when the difference between the value of the internal temperature of the device and the setpoint is greater than 12° C. and less than or equal to 15° C., both the small-diameter switch valve and the large-diameter switch valve are opened, and the intermediate-diameter switch valve is closed; when the difference between the value of the internal temperature of the device and the setpoint is greater than 15° C. and less than or equal to 18° C., the small-diameter switch valve is closed, and both the intermediate-diameter switch valve and the large-diameter switch valve are opened; and when the difference between the value of the internal temperature of the device and the setpoint is greater than 18° C., all of the small-diameter switch valve, the intermediate-diameter switch valve, and the large-diameter switch valve are opened.

TABLE 1

Control parameters of the combined low-temperature solenoid valve

| Type of a switch valve | Difference between the value of the internal temperature of the device and the setpoint | | | | | | |
|---|---|---|---|---|---|---|---|
| | 0° C. to 3° C. | 3° C. to 6° C. | 6° C. to 9° C. | 9° C. to 12° C. | 12° C. to 15° C. | 15° C. to 18° C. | Above 18° C. |
| Small-diameter switch valve | Opened | Closed | Closed | Opened | Opened | Closed | Opened |
| Intermediate-diameter switch valve | Closed | Opened | Closed | Opened | Closed | Opened | Opened |
| Large-diameter switch valve | Closed | Closed | Opened | Closed | Opened | Opened | Opened |

Figure 5:
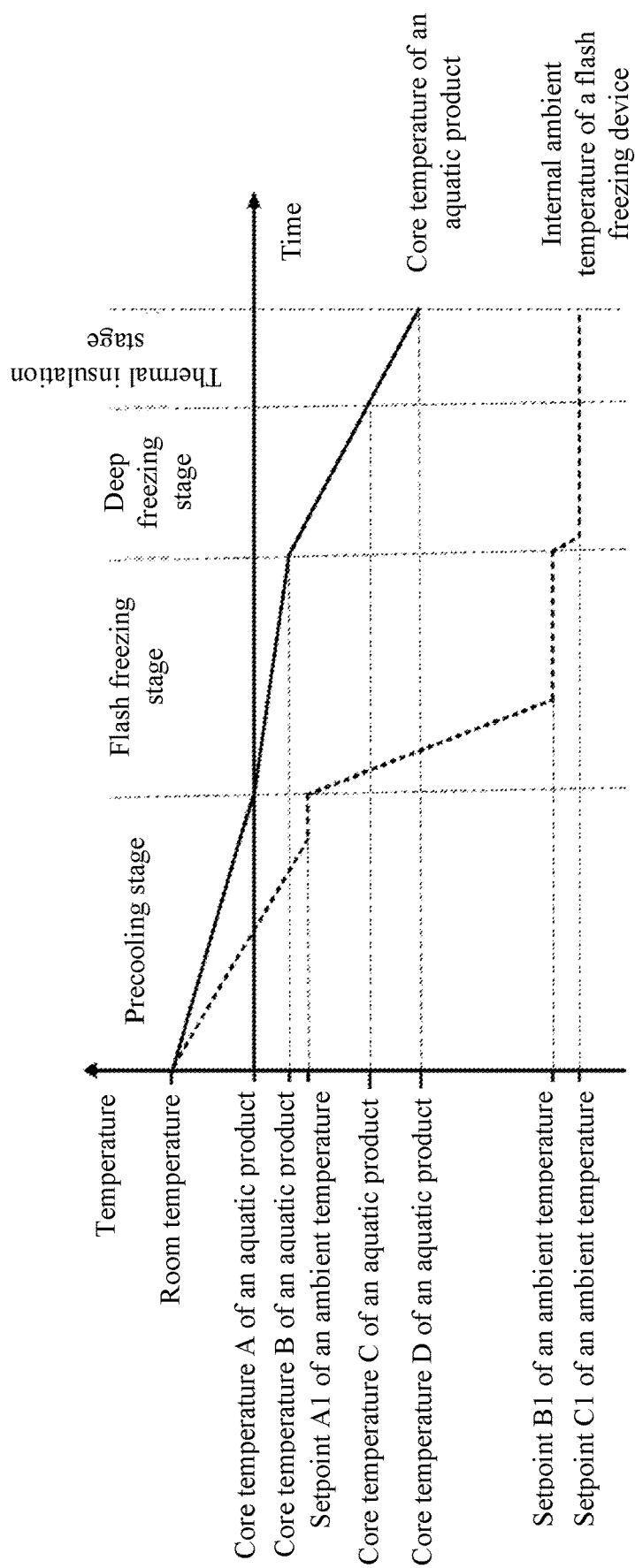
FIG. 5 is a schematic diagram of a cryogenic flash freezing process of an aquatic product using liquid nitrogen.

In FIG. 5, a process of flash freezing an aquatic product by using liquid nitrogen is divided into a precooling stage, a flash freezing stage, a deep freezing stage, and a thermal insulation stage. A rate of cooling an internal ambient temperature of the flash freezing device in the flash freezing stage is the highest, a cooling rate used in the deep freezing stage comes the second, a cooling rate used in the precooling stage is the lowest, and the ambient temperature in the device is kept stable in the thermal insulation stage. When the core temperature of the flash-frozen aquatic product reaches A, the flash freezing process is immediately switched from the precooling stage to the flash freezing stage. When the core temperature of the flash-frozen aquatic product reaches B, the flash freezing process is immediately switched from the flash freezing stage to the deep freezing stage. When the core temperature of the flash-frozen aquatic product reaches C, the flash freezing process is immediately switched from the deep freezing stage to the thermal insulation stage. When the core temperature of the flash-frozen aquatic product reaches D, the flash freezing process ends.

In FIG. 5, when the internal ambient temperature of the flash freezing device reaches A1, the device enters the thermal insulation mode of the precooling stage; when the internal ambient temperature of the flash freezing device reaches B1, the device enters the thermal insulation mode of the flash freezing stage; when the internal ambient temperature of the flash freezing device reaches C1, the device enters the thermal insulation mode of the deep freezing stage.

What is claimed is:
1. A system for supplying liquid nitrogen for shipborne cryogenic flash freezing of an aquatic product using liquid nitrogen, comprising:
    a main control system;
    a display unit;
    a liquid nitrogen supply system;
    a valve control unit;
    an acquisition unit; and
    a power unit, wherein:

the main control system is configured to control the valve control unit, the liquid nitrogen supply system, the acquisition unit, and the power unit, and integrates a liquid nitrogen flash freezing process database system for an aquatic product, via matching of parameters of the valve control unit, the liquid nitrogen supply system, the acquisition unit, and the power unit when aquatic products of different categories and different specifications are flash frozen by using the liquid nitrogen;

the display unit is configured to display and set multiple parameters of a control system and a real-time running status of the control system;

the acquisition unit includes temperature sensors, wherein a temperature sensor A is configured to measure an internal ambient temperature of a flash freezing device, and a temperature sensor B is configured to measure a core temperature of a flash-frozen aquatic product;

the liquid nitrogen supply system includes a liquid nitrogen storage tank system and a pipeline system, wherein the liquid nitrogen storage tank system includes multiple horizontal storage tanks connected in parallel, and the storage tanks are separately disposed on a deck and in a steering engine room based on existing space of a fishing ship;

the pipeline system includes a liquid nitrogen filling pipeline, a liquid nitrogen pressurization pipeline, a liquid nitrogen supply pipeline, and a release and exhaust pipeline;

each horizontal storage tank is connected to a liquid nitrogen filling pipeline, a liquid nitrogen supply pipeline, a release and exhaust pipeline, and a liquid nitrogen pressurization pipeline; an electric liquid filling stop valve is disposed on the liquid nitrogen filling pipeline close to an outlet of the horizontal storage tank;

a safety valve A, a safety valve B, a pressure valve, and a discharge valve are disposed on the release and exhaust pipeline close to the outlet of the horizontal storage tank, and a pressure setpoint of the safety valve B is higher than a pressure setpoint of the safety valve A, but is lower than an upper pressure limit of the horizontal storage tank;

an electric liquid nitrogen supply stop valve is disposed on the liquid nitrogen supply pipeline close to the outlet of the horizontal storage tank;

pressurized liquid outlet valves, a pressurizer, a pressure regulating valve, and pressurized liquid return valves are disposed on the liquid nitrogen pressurization pipeline;

at least two of the horizontal storage tanks share the pressurizer and the pressure regulating valve;

an upper electric stop valve needs to be mounted on a liquid nitrogen supply pipeline on the deck, and a lower electric stop valve is mounted on a liquid nitrogen supply pipeline in a cabin before the liquid nitrogen supply pipeline on the deck joins the liquid nitrogen supply pipeline in the cabin, and the joining liquid nitrogen supply pipeline is connected to the valve control unit, the valve control unit includes a liquid nitrogen filter, a pressure transmitter, a safety valve, an electric ball valve, a combined low-temperature solenoid valve, and a liquid nitrogen spraying system, and is configured to precisely adjust a flow of liquid nitrogen, wherein the safety valve is configured to monitor a pressure inside a liquid nitrogen tube, and automatically relieve pressure when a value of the pressure inside the liquid nitrogen tube is greater than a safety pressure value set for the safety valve;

the electric ball valve is a stop valve, and controls connection and disconnection of the liquid nitrogen tube, and the combined low-temperature solenoid valve combines a small-diameter switch valve, an intermediate-diameter switch valve, and a large-diameter switch valve, controls an open-close time proportion of a switch valve by means of a pulse width modulation (PWM) wave duty cycle, and equivalently simulates a size of an opening of a valve port of the switch valve, and the power unit is configured to control an exhaust fan and a circulation fan.

2. The control system according to claim 1, wherein:
the pressurized liquid outlet valves, the pressurizer, the pressure regulating valve, and the pressurized liquid return valves are sequentially connected, and then the pressurized liquid outlet valves and the pressurized liquid return valves are connected to the horizontal storage tanks, to regulate a liquid nitrogen pressure inside each horizontal storage tank to a needed setpoint, to ensure that the valve control unit functions; and a separate liquid collection tray is disposed at a bottom part of each horizontal storage tank, to collect leaked liquid nitrogen, thereby preventing the leaked liquid nitrogen from affecting safety of a ship body.

3. The control system according to claim 2, wherein a control method is implemented by the control system, the method comprising:

placing a to-be-frozen aquatic product inside a liquid nitrogen flash freezing device, selecting a corresponding liquid nitrogen flash freezing process in database system, and pressing an automatic button on an interface of a display unit, to start to flash freeze the aquatic product by using liquid nitrogen, wherein a flash freezing process is divided into four stages: a precooling stage, a flash freezing stage, a deep freezing stage, and a thermal insulation stage, and different cooling rates and flash freezing times are used for different stages, wherein a cooling rate used in the flash freezing stage is the highest, a cooling rate used in the deep freezing stage comes the second, a cooling rate used in the precooling stage is the lowest, and an ambient temperature in the device is kept stable in the thermal insulation stage.

4. The control system according to claim 3, wherein, within the control method implemented by the system:
the precooling stage includes steps of: a main control system sends an instruction to a valve control unit; the valve control unit starts working, and finally nebulizes and sprays liquid nitrogen onto the inside of the liquid nitrogen flash freezing device by using a liquid nitrogen spraying system; an internal temperature of the liquid nitrogen flash freezing device decreases, and when the internal temperature of the device decreases to a setpoint A1, the device enters a thermal insulation mode, and the valve control unit stops working; the aquatic product absorbs a large amount of cold energy in the flash freezing process, the internal temperature of the device increases, the valve control unit starts working again, and when the internal temperature of the device decreases to the setpoint A1 again, the device enters the thermal insulation mode again, and the valve control unit stops working; when a core temperature of the flash-frozen aquatic product reaches A, the precooling stage is completed, and the device enters the flash freezing stage;

the flash freezing stage includes steps of: the main control system sends an instruction to the valve control unit, the valve control unit works, the internal temperature of the liquid nitrogen flash freezing device continues to decrease, and when the internal temperature of the device decreases to a setpoint B1, the device enters the thermal insulation mode, and the valve control unit stops working; the aquatic product absorbs a large amount of cold energy in the flash freezing process, the internal temperature of the device increases, the valve control unit starts working again, and when the internal temperature of the device decreases to the setpoint B1 again, the device enters the thermal insulation mode again, and the valve control unit stops working; when the core temperature of the flash-frozen aquatic product reaches B, the flash freezing stage is completed, and the device enters the deep freezing stage;

the deep freezing stage includes steps of: the main control system sends an instruction to the valve control unit, the valve control unit works, the internal temperature of the liquid nitrogen flash freezing device continues to decrease, and when the internal temperature of the device decreases to a setpoint C1, the device enters the thermal insulation mode, and the valve control unit stops working; the aquatic product absorbs a large amount of cold energy in the flash freezing process, the internal temperature of the device increases, the valve control unit starts working again, and when the internal temperature of the device decreases to the setpoint C1 again, the device enters the thermal insulation mode again, and the valve control unit stops working; when the core temperature of the flash-frozen aquatic product reaches C, then the deep freezing stage is completed, and the device enters the thermal insulation stage; and after the device enters the thermal insulation stage, the core temperature of the flash-frozen aquatic product continues to decrease, and when the core temperature reaches D, flash freezing ends, and the device stops working.

5. The control system according to claim 3, wherein for all of the precooling stage, the flash freezing stage, the deep freezing stage, and the thermal insulation stage, control parameters of the combined low-temperature solenoid valve include: when a difference between a value of the internal temperature of the device and the setpoint is less than or equal to 3° C., a small-diameter switch valve is opened, and an intermediate-diameter switch valve and a large-diameter switch valve are closed; when the difference between the value of the internal temperature of the device and the setpoint is greater than 3° C. and less than or equal to 6° C., the intermediate-diameter switch valve is opened, and the small-diameter switch valve and the large-diameter switch valve are closed; when the difference between the value of the internal temperature of the device and the setpoint is greater than 6° C. and less than or equal to 9° C., the large-diameter switch valve is opened, and the small-diameter switch valve and the intermediate-diameter switch valve are closed; when the difference between the value of the internal temperature of the device and the setpoint is greater than 9° C. and less than or equal to 12° C., both the small-diameter switch valve and the intermediate-diameter switch valve are opened, and the large-diameter switch valve is closed; when the difference between the value of the internal temperature of the device and the setpoint is greater than 12° C. and less than or equal to 15° C., both the small-diameter switch valve and the large-diameter switch valve are opened, and the intermediate-diameter switch valve is closed; when the difference between the value of the internal temperature of the device and the setpoint is greater than 15° C. and less than or equal to 18° C., the small-diameter switch valve is closed, and the intermediate-diameter switch valve and the large-diameter switch valve are opened; and when the difference between the value of the internal temperature of the device and the setpoint is greater than 18° C., all of the small-diameter switch valve, the intermediate-diameter switch valve, and the large-diameter switch valve are opened.

6. The control system according to claim 1, wherein a liquid level gauge is mounted inside each horizontal storage tank, to gauge a remaining liquid nitrogen amount in the tank.

7. The control system according to claim 6, wherein a control method is implemented by the control system, the method comprising:

placing a to-be-frozen aquatic product inside a liquid nitrogen flash freezing device, selecting a corresponding liquid nitrogen flash freezing process in database system, and pressing an automatic button on an interface of a display unit, to start to flash freeze the aquatic product by using liquid nitrogen, wherein a flash freezing process is divided into four stages: a precooling stage, a flash freezing stage, a deep freezing stage, and a thermal insulation stage, and different cooling rates and flash freezing times are used for different stages, wherein a cooling rate used in the flash freezing stage is the highest, a cooling rate used in the deep freezing stage comes the second, a cooling rate used in the precooling stage is the lowest, and an ambient temperature in the device is kept stable in the thermal insulation stage.

8. The control system according to claim 7, wherein, within the control method implemented by the system:

the precooling stage includes steps of: a main control system sends an instruction to a valve control unit; the valve control unit starts working, and finally nebulizes and sprays liquid nitrogen onto the inside of the liquid nitrogen flash freezing device by using a liquid nitrogen spraying system; an internal temperature of the liquid nitrogen flash freezing device decreases, and when the internal temperature of the device decreases to a setpoint A1, the device enters a thermal insulation mode, and the valve control unit stops working; the aquatic product absorbs a large amount of cold energy in the flash freezing process, the internal temperature of the device increases, the valve control unit starts working again, and when the internal temperature of the device decreases to the setpoint A1 again, the device enters the thermal insulation mode again, and the valve control unit stops working; when a core temperature of the flash-frozen aquatic product reaches A, the precooling stage is completed, and the device enters the flash freezing stage;

the flash freezing stage includes steps of: the main control system sends an instruction to the valve control unit, the valve control unit works, the internal temperature of the liquid nitrogen flash freezing device continues to decrease, and when the internal temperature of the device decreases to a setpoint B1, the device enters the thermal insulation mode, and the valve control unit stops working; the aquatic product absorbs a large amount of cold energy in the flash freezing process, the internal temperature of the device increases, the valve control unit starts working again, and when the internal temperature of the device decreases to the setpoint B1 again, the device enters the thermal insulation mode again, and the valve control unit stops working; when the core temperature of the flash-frozen aquatic product reaches B, the flash freezing stage is completed, and the device enters the deep freezing stage;

the deep freezing stage includes steps of: the main control system sends an instruction to the valve control unit, the valve control unit works, the internal temperature of the liquid nitrogen flash freezing device continues to decrease, and when the internal temperature of the device decreases to a setpoint C1, the device enters the thermal insulation mode, and the valve control unit stops working; the aquatic product absorbs a large amount of cold energy in the flash freezing process, the internal temperature of the device increases, the valve control unit starts working again, and when the internal temperature of the device decreases to the setpoint C1 again, the device enters the thermal insulation mode again, and the valve control unit stops working; when the core temperature of the flash-frozen aquatic product reaches C, then the deep freezing stage is completed, and the device enters the thermal insulation stage; and after the device enters the thermal insulation stage, the core temperature of the flash-frozen aquatic product continues to decrease, and when the core temperature reaches D, flash freezing ends, and the device stops working.

9. The control system according to claim 7, wherein for all of the precooling stage, the flash freezing stage, the deep freezing stage, and the thermal insulation stage, control parameters of the combined low-temperature solenoid valve include: when a difference between a value of the internal temperature of the device and the setpoint is less than or equal to 3° C., a small-diameter switch valve is opened, and an intermediate-diameter switch valve and a large-diameter switch valve are closed; when the difference between the value of the internal temperature of the device and the setpoint is greater than 3° C. and less than or equal to 6° C., the intermediate-diameter switch valve is opened, and the small-diameter switch valve and the large-diameter switch valve are closed; when the difference between the value of the internal temperature of the device and the setpoint is greater than 6° C. and less than or equal to 9° C., the large-diameter switch valve is opened, and the small-diameter switch valve and the intermediate-diameter switch valve are closed; when the difference between the value of the internal temperature of the device and the setpoint is greater than 9° C. and less than or equal to 12° C., both the small-diameter switch valve and the intermediate-diameter switch valve are opened, and the large-diameter switch valve is closed; when the difference between the value of the internal temperature of the device and the setpoint is greater than 12° C. and less than or equal to 15° C., both the small-diameter switch valve and the large-diameter switch valve are opened, and the intermediate-diameter switch valve is closed; when the difference between the value of the internal temperature of the device and the setpoint is greater than 15° C. and less than or equal to 18° C., the small-diameter switch valve is closed, and the intermediate-diameter switch valve and the large-diameter switch valve are opened; and when the difference between the value of the internal temperature of the device and the setpoint is greater than 18° C., all of the small-diameter switch valve, the intermediate-diameter switch valve, and the large-diameter switch valve are opened.

10. The control system according to claim 1, wherein a control method is implemented by the control system, the method comprising:

placing a to-be-frozen aquatic product inside a liquid nitrogen flash freezing device, selecting a corresponding liquid nitrogen flash freezing process in database system, and pressing an automatic button on an interface of a display unit, to start to flash freeze the aquatic product by using liquid nitrogen, wherein a flash freezing process is divided into four stages: a precooling stage, a flash freezing stage, a deep freezing stage, and a thermal insulation stage, and different cooling rates and flash freezing times are used for different stages, and wherein a cooling rate used in the flash freezing stage is the highest, a cooling rate used in the deep freezing stage comes the second, a cooling rate used in the precooling stage is the lowest, and an ambient temperature in the device is kept stable in the thermal insulation stage.

11. The control system according to claim 10, wherein for all of the precooling stage, the flash freezing stage, the deep freezing stage, and the thermal insulation stage, control parameters of the combined low-temperature solenoid valve include: when a difference between a value of the internal temperature of the device and the setpoint is less than or equal to 3° C., a small-diameter switch valve is opened, and an intermediate-diameter switch valve and a large-diameter switch valve are closed; when the difference between the value of the internal temperature of the device and the setpoint is greater than 3° C. and less than or equal to 6° C., the intermediate-diameter switch valve is opened, and the small-diameter switch valve and the large-diameter switch valve are closed; when the difference between the value of the internal temperature of the device and the setpoint is greater than 6° C. and less than or equal to 9° C., the large-diameter switch valve is opened, and the small-diameter switch valve and the intermediate-diameter switch valve are closed; when the difference between the value of the internal temperature of the device and the setpoint is greater than 9° C. and less than or equal to 12° C., both the small-diameter switch valve and the intermediate-diameter switch valve are opened, and the large-diameter switch valve is closed; when the difference between the value of the internal temperature of the device and the setpoint is greater than 12° C. and less than or equal to 15° C., both the small-diameter switch valve and the large-diameter switch valve are opened, and the intermediate-diameter switch valve is closed; when the difference between the value of the internal temperature of the device and the setpoint is greater than 15° C. and less than or equal to 18° C., the small-diameter switch valve is closed, and the intermediate-diameter switch valve and the large-diameter switch valve are opened; and when the difference between the value of the internal temperature of the device and the setpoint is greater than 18° C., all of the small-diameter switch valve, the intermediate-diameter switch valve, and the large-diameter switch valve are opened.

12. The control system according to claim 10, wherein, within the control method implemented by the system:

the precooling stage includes steps of: a main control system sends an instruction to a valve control unit; the valve control unit starts working, and finally nebulizes and sprays liquid nitrogen onto the inside of the liquid nitrogen flash freezing device by using a liquid nitrogen spraying system; an internal temperature of the liquid nitrogen flash freezing device decreases, and when the internal temperature of the device decreases to a setpoint A1, the device enters a thermal insulation mode, and the valve control unit stops working; the aquatic product absorbs a large amount of cold energy in the flash freezing process, the internal temperature of the device increases, the valve control unit starts working again, and when the internal temperature of the device decreases to the setpoint A1 again, the device enters the thermal insulation mode again, and the valve control unit stops working; when a core temperature of the flash-frozen aquatic product reaches A, the precooling stage is completed, and the device enters the flash freezing stage;

the flash freezing stage includes steps of: the main control system sends an instruction to the valve control unit, the valve control unit works, the internal temperature of the liquid nitrogen flash freezing device continues to decrease, and when the internal temperature of the device decreases to a setpoint B1, the device enters the thermal insulation mode, and the valve control unit stops working; the aquatic product absorbs a large amount of cold energy in the flash freezing process, the internal temperature of the device increases, the valve control unit starts working again, and when the internal temperature of the device decreases to the setpoint B1 again, the device enters the thermal insulation mode again, and the valve control unit stops working; when the core temperature of the flash-frozen aquatic product reaches B, the flash freezing stage is completed, and the device enters the deep freezing stage;

the deep freezing stage includes steps of: the main control system sends an instruction to the valve control unit, the valve control unit works, the internal temperature of the liquid nitrogen flash freezing device continues to decrease, and when the internal temperature of the device decreases to a setpoint C1, the device enters the thermal insulation mode, and the valve control unit stops working; the aquatic product absorbs a large amount of cold energy in the flash freezing process, the internal temperature of the device increases, the valve control unit starts working again, and when the internal temperature of the device decreases to the setpoint C1 again, the device enters the thermal insulation mode again, and the valve control unit stops working; when the core temperature of the flash-frozen aquatic product reaches C, then the deep freezing stage is completed, and the device enters the thermal insulation stage; and after the device enters the thermal insulation stage, the core temperature of the flash-frozen aquatic product continues to decrease, and when the core temperature reaches D, flash freezing ends, and the device stops working.

13. The control system according to claim 6, wherein for all of the precooling stage, the flash freezing stage, the deep freezing stage, and the thermal insulation stage, control parameters of the combined low-temperature solenoid valve include: when a difference between a value of the internal temperature of the device and the setpoint is less than or equal to 3° C., a small-diameter switch valve is opened, and an intermediate-diameter switch valve and a large-diameter switch valve are closed; when the difference between the value of the internal temperature of the device and the setpoint is greater than 3° C. and less than or equal to 6° C., the intermediate-diameter switch valve is opened, and the small-diameter switch valve and the large-diameter switch valve are closed; when the difference between the value of the internal temperature of the device and the setpoint is greater than 6° C. and less than or equal to 9° C., the large-diameter switch valve is opened, and the small-diameter switch valve and the intermediate-diameter switch valve are closed; when the difference between the value of the internal temperature of the device and the setpoint is greater than 9° C. and less than or equal to 12° C., both the small-diameter switch valve and the intermediate-diameter switch valve are opened, and the large-diameter switch valve is closed; when the difference between the value of the internal temperature of the device and the setpoint is greater than 12° C. and less than or equal to 15° C., both the small-diameter switch valve and the large-diameter switch valve are opened, and the intermediate-diameter switch valve is closed; when the difference between the value of the internal temperature of the device and the setpoint is greater than 15° C. and less than or equal to 18° C., the small-diameter switch valve is closed, and the intermediate-diameter switch valve and the large-diameter switch valve are opened; and when the difference between the value of the internal temperature of the device and the setpoint is greater than 18° C., all of the small-diameter switch valve, the intermediate-diameter switch valve, and the large-diameter switch valve are opened.

14. The control system according to claim 1, wherein the horizontal storage tanks each are of a double-layer structure comprising an inner housing and an outer housing, space between the inner housing and the outer housing is vacuumized to implement thermal insulation, and ribbed plates are used for dense support between the inner housing and the outer housing; and the outside of the pipeline system is covered by a thermal insulation material.

15. The control system according to claim 14, wherein all of the electric liquid filling stop valves, the pressurized liquid outlet valves, the pressurized liquid return valves, the electric liquid nitrogen supply stop valves, the upper electric stop valve, and the lower electric stop valve can be controlled through remote control, facilitating onboard operation.

16. The control system according to claim 15, wherein a control method is implemented by the control system, the method comprising:

placing a to-be-frozen aquatic product inside a liquid nitrogen flash freezing device, selecting a corresponding liquid nitrogen flash freezing process in database system, and pressing an automatic button on an interface of a display unit, to start to flash freeze the aquatic product by using liquid nitrogen, wherein a flash freezing process is divided into four stages: a precooling stage, a flash freezing stage, a deep freezing stage, and a thermal insulation stage, and different cooling rates and flash freezing times are used for different stages, wherein a cooling rate used in the flash freezing stage is the highest, a cooling rate used in the deep freezing stage comes the second, a cooling rate used in the precooling stage is the lowest, and an ambient temperature in the device is kept stable in the thermal insulation stage.

17. The control system according to claim 16, wherein the control method further comprises the precooling stage includes steps of: a main control system sends an instruction to a valve control unit; the valve control unit starts working, and finally nebulizes and sprays liquid nitrogen onto the inside of the liquid nitrogen flash freezing device by using a liquid nitrogen spraying system; an internal temperature of the liquid nitrogen flash freezing device decreases, and when the internal temperature of the device decreases to a setpoint A1, the device enters a thermal insulation mode, and the valve control unit stops working; the aquatic product absorbs a large amount of cold energy in the flash freezing process, the internal temperature of the device increases, the valve control unit starts working again, and when the internal temperature of the device decreases to the setpoint A1 again, the device enters the thermal insulation mode again, and the valve control unit stops working; when a core temperature of the flash-frozen aquatic product reaches A, the precooling stage is completed, and the device enters the flash freezing stage;

the flash freezing stage includes steps of: the main control system sends an instruction to the valve control unit, the valve control unit works, the internal temperature of the liquid nitrogen flash freezing device continues to decrease, and when the internal temperature of the device decreases to a setpoint B1, the device enters the thermal insulation mode, and the valve control unit stops working; the aquatic product absorbs a large amount of cold energy in the flash freezing process, the internal temperature of the device increases, the valve control unit starts working again, and when the internal temperature of the device decreases to the setpoint B1 again, the device enters the thermal insulation mode again, and the valve control unit stops working; when the core temperature of the flash-frozen aquatic product reaches B, the flash freezing stage is completed, and the device enters the deep freezing stage;

the deep freezing stage includes steps of: the main control system sends an instruction to the valve control unit, the valve control unit works, the internal temperature of the liquid nitrogen flash freezing device continues to decrease, and when the internal temperature of the device decreases to a setpoint C1, the device enters the thermal insulation mode, and the valve control unit stops working; the aquatic product absorbs a large amount of cold energy in the flash freezing process, the internal temperature of the device increases, the valve control unit starts working again, and when the internal temperature of the device decreases to the setpoint C1 again, the device enters the thermal insulation mode again, and the valve control unit stops working; when the core temperature of the flash-frozen aquatic product reaches C, then the deep freezing stage is completed, and the device enters the thermal insulation stage; and after the device enters the thermal insulation stage, the core temperature of the flash-frozen aquatic product continues to decrease, and when the core temperature reaches D, flash freezing ends, and the device stops working.

18. The control system according to claim 14, wherein a control method is implemented by the control system, the method comprising:

placing a to-be-frozen aquatic product inside a liquid nitrogen flash freezing device, selecting a corresponding liquid nitrogen flash freezing process in database system, and pressing an automatic button on an interface of a display unit, to start to flash freeze the aquatic product by using liquid nitrogen, wherein a flash freezing process is divided into four stages: a precooling stage, a flash freezing stage, a deep freezing stage, and a thermal insulation stage, and different cooling rates and flash freezing times are used for different stages, wherein a cooling rate used in the flash freezing stage is the highest, a cooling rate used in the deep freezing stage comes the second, a cooling rate used in the precooling stage is the lowest, and an ambient temperature in the device is kept stable in the thermal insulation stage.

19. The control system according to claim 18, wherein, within the control method implemented by the system:

the precooling stage includes steps of: a main control system sends an instruction to a valve control unit; the valve control unit starts working, and finally nebulizes and sprays liquid nitrogen onto the inside of the liquid nitrogen flash freezing device by using a liquid nitrogen spraying system; an internal temperature of the liquid nitrogen flash freezing device decreases, and when the internal temperature of the device decreases to a setpoint A1, the device enters a thermal insulation mode, and the valve control unit stops working; the aquatic product absorbs a large amount of cold energy in the flash freezing process, the internal temperature of the device increases, the valve control unit starts working again, and when the internal temperature of the device decreases to the setpoint A1 again, the device enters the thermal insulation mode again, and the valve control unit stops working; when a core temperature of the flash-frozen aquatic product reaches A, the precooling stage is completed, and the device enters the flash freezing stage;

the flash freezing stage includes steps of: the main control system sends an instruction to the valve control unit, the valve control unit works, the internal temperature of the liquid nitrogen flash freezing device continues to decrease, and when the internal temperature of the device decreases to a setpoint B1, the device enters the thermal insulation mode, and the valve control unit stops working; the aquatic product absorbs a large amount of cold energy in the flash freezing process, the internal temperature of the device increases, the valve control unit starts working again, and when the internal temperature of the device decreases to the setpoint B1 again, the device enters the thermal insulation mode again, and the valve control unit stops working; when the core temperature of the flash-frozen aquatic product reaches B, the flash freezing stage is completed, and the device enters the deep freezing stage;

the deep freezing stage includes steps of: the main control system sends an instruction to the valve control unit, the valve control unit works, the internal temperature of the liquid nitrogen flash freezing device continues to decrease, and when the internal temperature of the device decreases to a setpoint C1, the device enters the thermal insulation mode, and the valve control unit stops working; the aquatic product absorbs a large amount of cold energy in the flash freezing process, the internal temperature of the device increases, the valve control unit starts working again, and when the internal temperature of the device decreases to the setpoint C1 again, the device enters the thermal insulation mode again, and the valve control unit stops working; when the core temperature of the flash-frozen aquatic product reaches C, then the deep freezing stage is completed, and the device enters the thermal insulation stage; and after the device enters the thermal insulation stage, the core temperature of the flash-frozen aquatic product continues to decrease, and when the core temperature reaches D, flash freezing ends, and the device stops working.

20. The control system according to claim 18, wherein for all of the precooling stage, the flash freezing stage, the deep freezing stage, and the thermal insulation stage, control parameters of the combined low-temperature solenoid valve include: when a difference between a value of the internal temperature of the device and the setpoint is less than or equal to 3° C., a small-diameter switch valve is opened, and an intermediate-diameter switch valve and a large-diameter switch valve are closed; when the difference between the value of the internal temperature of the device and the setpoint is greater than 3° C. and less than or equal to 6° C., the intermediate-diameter switch valve is opened, and the small-diameter switch valve and the large-diameter switch valve are closed; when the difference between the value of the internal temperature of the device and the setpoint is greater than 6° C. and less than or equal to 9° C., the large-diameter switch valve is opened, and the small-diameter switch valve and the intermediate-diameter switch valve are closed; when the difference between the value of the internal temperature of the device and the setpoint is greater than 9° C. and less than or equal to 12° C., both the small-diameter switch valve and the intermediate-diameter switch valve are opened, and the large-diameter switch valve is closed; when the difference between the value of the internal temperature of the device and the setpoint is greater than 12° C. and less than or equal to 15° C., both the small-diameter switch valve and the large-diameter switch valve are opened, and the intermediate-diameter switch valve is closed; when the difference between the value of the internal temperature of the device and the setpoint is greater than 15° C. and less than or equal to 18° C., the small-diameter switch valve is closed, and the intermediate-diameter switch valve and the large-diameter switch valve are opened; and when the difference between the value of the internal temperature of the device and the setpoint is greater than 18° C., all of the small-diameter switch valve, the intermediate-diameter switch valve, and the large-diameter switch valve are opened.

* * * * *